Sept. 9, 1941.  K. DANIEL  2,255,559
PROCESS FOR PRODUCING ENDLESS SOUND-RECORDING TAPES JOINED
TOGETHER IN CROSSED FASHION
Filed April 17, 1939
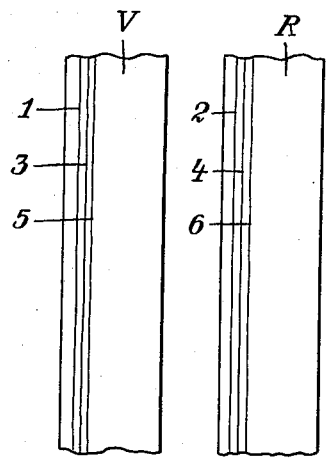
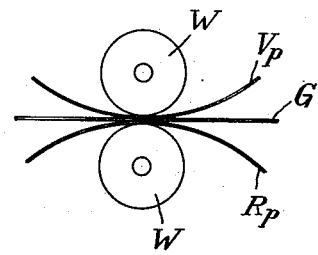
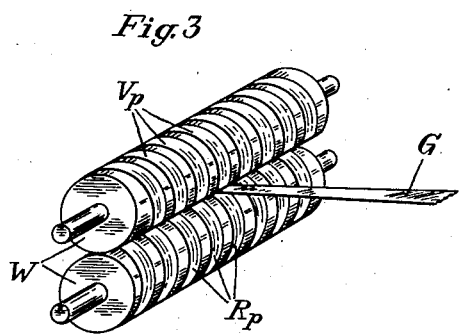
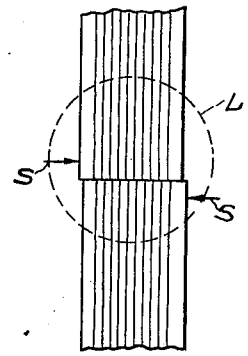
Inventor:
Karl Daniel
By: Mason & Porter
Attorneys Patented Sept. 9, 1941

2,255,559

UNITED STATES PATENT OFFICE 2,255,559

PROCESS FOR PRODUCING ENDLESS SOUND-RECORDING TAPES JOINED TOGETHER IN CROSSED FASHION

Karl Daniel, Cologne-Sulz, Germany

Application April 17, 1939, Serial No. 268,441
In Germany June 19, 1937

2 Claims. (Cl. 274—46)

The invention relates to a process for the production, by means of stamping or impression matrices, of endless sound-recording tapes which are provided on both sides with sound grooves merging one into the other and are joined together in crossed fashion.

The difficulties encountered in practice in the duplication of such sound tapes having records on both sides are overcome by the invention owing to the fact that the preparation of the sound record is effected in series alternately on two endless tapes which are not joined together in crossed fashion, and that a finite tape is impressed on both sides with the finite matrix tapes produced in the usual manner from the two tapes and finally the ends of the impressed tape are secured together by adhesion in crossed fashion.

The matrix tapes are advantageously wound spirally and in opposite directions on commonly and uniformly driven cylinders, between which the blank tape to receive the stamping or impression is passed with relative transverse displacement to the cylinders. In the duplication of sound tapes bearing a record on one side, it is already known to wind the matrix spirally onto a cylinder and to pass the blank tape to receive the impression between this cylinder and a counter-pressure arrangement with simultaneous transverse displacement, but the present invention affords particular advantages in the production of sound tapes having recordings on both sides with common uniform drive of the two cylinders, since the necessary equal movement of the two matrices and therefore the coincidence of the starting point and the end point of the series of record on both sides of the band to be impressed is thereby ensured.

The invention is shown by way of example in purely diagrammatic manner in the drawing.

Figure 1 shows sections of the endless original sound tapes employed for the production of the master matrices.

Figures 2 and 3 show two different methods of impression and

Figure 4 shows how the ends of the matrix tape are brought into alignment with one another.

Two original sound-recording tapes are provided with parallel recording lines extending in the longitudinal direction thereof, by alternately forming the sound lines upon a single face of each tape. Short sections of such endless original tapes V and R are shown in Fig. 1. The recording is effected by two recording instruments, or by a compound instrument, in such a manner that after the formation of the sound line 1 on the tape V is completed for the periphery of this tape, the second sound line 2 is then formed in succession upon the tape R; and upon completion of the sound line 2 for the periphery of the tape R, the sound line 3 is then formed on the tape V in adjacent consecutive order with the sound line 1; and when this is completed for the periphery of the tape V, the sound line 4 is formed on the tape R, and so on; so that the tape V bears only the odd-numbered sound lines in consecutive arrangement, and the tape R bears only the even-numbered sound lines in a similar consecutive arrangement. It will be noted that if the short sections of the two tapes V and R, as shown in Fig. 1, were disposed one upon the other in back-to-back relationship, with the impressed sides outwardly, and the ends were joined together in crossed fashion (that is, after giving one end a turn through 180 degrees), the known continuous sound record would be obtained, so that the sound line 1 on the tape V, representing the front side, would merge uninterruptedly into the sound line 2 on the tape R, representing the rear side of the conjoint record; the sound line 2 would merge uninterruptedly into the line 3 on the tape V, representing the front side, and so on.

The two endless tapes V and R are then employed for the production of master matrices, which may be effected in any known manner. The master matrices $V_p$ and $R_p$ are then passed with the tape G to be impressed between two impression cylinders W, whereby sound records are formed on both sides of the tape G in one operation, the said records being exactly in phase.

Another method of stamping or impressing is shown in Figure 3. The master matrices $V_p$ and $R_p$ are here wound spirally and in opposite directions on to impression cylinders W. The tape G is passed between the cylinders W with relative transverse displacement thereto, whereby the same result is obtained as by the method described in the foregoing. The latter method affords the advantage that the master matrices may be made very considerably thinner than in the foregoing method.

In order that the ends of the impressed tape may be accurately joined so that the sound lines are brought into exactly coincident positions, known optical arrangements may be employed (conventionally shown as a lens L in Figure 4), by means of which the tape ends placed one upon the other may be simultaneously seen in suitably magnified form as is shown in Figure 4 and the smallest deviations can be accurately observed. In this case, the matrices may be moved into exactly coincident positions by providing suitable adjusting devices as indicated by the arrow S.

I claim:

1. A process for producing endless sound-record tapes having a 180 degree turn therein and having sound-record impressions therein extending continuously along the opposite faces in alternate fashion, which comprises preparing an original sound record on a single face of each of two tapes, successive lines of the sound record being formed alternately on said tapes so that odd-numbered grooves appear consecutively on such face of one tape and even-numbered grooves appear consecutively on such face of the other tape, preparing matrices from the original records as open-ended strips, and simultaneously and progressively pressing the matrices into an open-ended blank sound-record tape so that sound record impressions are formed in both faces thereof, and finally joining the ends of the impressed tape in crossed fashion with one of said ends turned through 180 degrees with respect to the other and with the sound record lines of each face at one end forming extensions of the corresponding sound record lines at the opposite face at the other end, so that the two faces of the impressed tape form a continuous surface with sound-record impressions extending therealong.

2. A process for producing endless sound-record tapes having a 180 degree turn therein and having sound-record impressions therein extending continuously along the opposite faces in alternate fashion, which comprises preparing an original sound record on a single face of each of two tapes, successive lines of the sound record being formed alternately on said tapes so that odd-numbered grooves appear consecutively on such face of one tape and even-numbered grooves appear consecutively on such face of the other tape, preparing matrices from the original records as open-ended strips, mounting and maintaining the matrices as oppositely-pitched and symmetrical spirals, simultaneously and progressively pressing the matrices into the opposite faces of a blank sound-record strip while translating the strip along the length of the spirals, and finally joining the ends of the impressed tape in crossed fashion with one of said ends turned through 180 degrees with respect to the other and with the sound-record lines of each face at one end forming extensions of the corresponding sound-record lines at the opposite face at the other end, so that the two faces of the impressed tape form a continuous surface with sound-record impressions extending therealong.

KARL DANIEL.